United States Patent
Zhang et al.

(10) Patent No.: US 9,550,679 B2
(45) Date of Patent: Jan. 24, 2017

(54) PREPARATION METHOD OF GRAPHENE AND GRAPHENE OXIDE BASED ON MIXED ACID SYSTEM

(71) Applicant: SHENZHEN CANTONNET ENERGY SERVICES CO., LTD., Shenzhen (CN)

(72) Inventors: Linde Zhang, Shenzhen (CN); Mingdong Zhang, Shenzhen (CN)

(73) Assignee: SHENZHEN CANTONNET ENERGY SERVICES CO., LTD., Shenzhen (CN)

( * ) Notice: Subject to any disclaimer, the term of this patent is extended or adjusted under 35 U.S.C. 154(b) by 0 days.

(21) Appl. No.: 15/106,842

(22) PCT Filed: Dec. 31, 2013

(86) PCT No.: PCT/CN2013/091214
§ 371 (c)(1),
(2) Date: Jun. 21, 2016

(87) PCT Pub. No.: WO2015/100664
PCT Pub. Date: Jul. 9, 2015

(65) Prior Publication Data
US 2016/0311688 A1    Oct. 27, 2016

(51) Int. Cl.
*C01B 31/04* (2006.01)

(52) U.S. Cl.
CPC ......... *C01B 31/0476* (2013.01); *C01B 31/043* (2013.01)

(58) Field of Classification Search
CPC .. C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32

USPC ........................................................ 423/448
See application file for complete search history.

(56) References Cited

U.S. PATENT DOCUMENTS

2012/0129736 A1* 5/2012 Tour ...................... B82Y 30/00
                                                              507/140

FOREIGN PATENT DOCUMENTS

| CN | 102897757 | 1/2013 |
|----|-----------|--------|
| CN | 102897757 A | 1/2013 |
| KR | 20130117388 A | 10/2013 |
| WO | WO2011019095 A1 | 2/2011 |
| WO | WO2012145911 A1 | 11/2012 |

OTHER PUBLICATIONS

K.S. Novoselov, et al. Electric Field Effect in Atomically Thin Carbon Films. Science306, 666(204).

* cited by examiner

*Primary Examiner* — Daniel C McCracken
(74) *Attorney, Agent, or Firm* — Gokalp Bayramoglu

(57) ABSTRACT

The present invention relates to a preparation method of graphene oxide based on mixed acid system. The method consists of the following steps. a. Preparation of graphite powder; b. Preparation of suspension liquid of first acid system; c. Preparation of second acid system; d. Preparation of graphene oxide. The invention also relates to a preparation method of graphene using graphene oxide obtained by method mentioned above. The method consists of the following steps. e. Preparation of graphene oxide-dispersant solution; f. Reduction of graphene oxide; g. Process of supersonic stripping; h. Obtaining graphene by separation and drying. The preparation methods of graphene oxide and graphene in our invention could reduce the dosage of strong acid as well as heat release of chemical reaction, and cause less corrosion to our equipments, which makes the reaction more effective and properties of graphene products better, facilitating the achievement of large scale industrial production.

10 Claims, No Drawings

PREPARATION METHOD OF GRAPHENE AND GRAPHENE OXIDE BASED ON MIXED ACID SYSTEM

TECHNICAL FIELD

The invention relates to a preparation method of graphene and graphene oxide, specifically referring to graphene and graphene oxide preparation method based on a mixed-acid system.

BACKGROUND

Since Andre Geim and Konstanin Novoselof from University of Manchester in UK successfully stripped pyrolytic graphite out and observed graphene in 2004 (Novoselov, K. S.; Geim, A. K.; Morozov, S. V.; Jiang, D.; Zhang, Y.; Dubonos, S. V.; Grigorieva, I. V.; Firsov, A. A. Science 2004, 306, 666-9), the new carbon materials has been remaining a hot topic in relevant areas. The success of stripping graphene out breaks the prediction about thermal instability of two-dimensional crystal theoretically, and brings about possibilities for more investigations and explorations in new fields.

Perfect graphene is supposed to own ideal two-dimensional structure, which consists of hexagonal lattice. Every single carbon atom is combined with other three carbon atoms by σ bond in the direction of lattice plane, and non-bonding electrons serves as π electrons, forming π orbit system vertical to the lattice plane. The π electron could move randomly in the plane, which enables graphene to own fine electrical conductivity and sustain electric current whose density is six orders of magnitude more than copper. Graphene also owns record-breaking thermal conductivity. The thermal conductivity of pure graphene could reach 2000-4000W·m^(−1)·K^(−1). Graphene also has excellent strength and large surface area. Besides, the special structure of graphene provides unique energy band structure and enables it with half integer quantum hall effect and perfect tunneling effect, as well as electrical conductivity that would never fade away. The special characteristics mentioned above guarantee graphene a promising prospect of application in fields of materials and electronic circuits. Therefore, synthesizing graphene in a large scale is in high demand.

There're two traditional ways to synthesis graphene, which are physical method and chemical method respectively. Properties of graphene obtained through the two methods are different from each other. Physical methods include mechanical stripping, electric arc discharge, ultrasonic dispersion etc. Graphene layers obtained through physical methods are comparatively intact, but there're problems like low productivity, uncertainty of quality, command for special equipment and high cost. Chemical methods include bottom up organic synthesis, oxidation-reduction process, solvothermal synthesis and chemical vapor deposition. Equipment and raw materials are strictly required for organic synthesis method, so it's difficult to achieve mass production in this way. Production quality isn't stable for solvothermal method, thus the average quality is poor. Chemical vapor deposition method costs too high and cannot achieve scale production. Among all those methods, only oxidation-reduction process can work without special equipment, and quality of graphene obtained through this method is stable. Thus it's the most suitable way for industrialized production. During preparation of graphene by redox method, the intermediate of graphene oxide has been involved. Due to various functional groups of graphene oxide, including epoxy hydroxyl, carboxyl, carbonyl etc., it can be dispersed well in an aqueous solution and is capable of forming a stable colloid, so it's easier to chemically modify graphene oxide than graphene. Therefore, the graphene oxide is also a basic raw material for further chemical modification of graphene. However, in any of the preparation process of an oxidized graphene, large amount of strong acid and strong oxidant intercalating agents are consumed and cause corrosion to equipments. Moreover, the process of mixing intercalation agents and strong oxidants often generates a large amount of heat release, which might cause severe reactions between strong oxidizing agent and the intercalation agent, and even explosion. Moreover, sometimes solid material is used as strong oxidant. The inefficient solid-solid reaction occurs between the solid strong oxidant and the graphite dispersed in intercalation agent, and it's difficult to achieve mass production. Therefore, if industrialists use redox method for mass production, several problems (e.g. heat release, equipment corrosion, and reaction rate) need to be solved.

In addition, in the reduction process of graphene oxide, appropriate reducing agents are also critical. Traditionally, graphene oxide reduction is carried out at a neutral or alkaline environment, which causes the agglomeration of graphene oxide, and the reduction reaction would not continue until graphene oxide is dispersed. However, it an acidic environment, all these problems can be avoided and the reduction reaction occurs homogeneously. So, for the mass reduction process, it is very necessary to select appropriate reducing agents that are suitable for the acid environment.

SUMMARY

In order to solve problems like large heat release, equipment corrosion, low reaction rate, and agglomeration resulting from alkaline environment in reducing steps when preparing graphene oxide and graphene, we put forward a preparation method of graphene oxide and graphene based on mixed acid system.

The technical proposal adopted in our invention for problems mentioned above is depicted as follows.

The preparation method of graphene oxide based on mixed acid system includes the following steps:

a. Preparation of graphite powder. Put raw materials of graphite into processes of washing, drying and grinding, and then put them through 200-mesh sieves to obtain graphite powder. The raw materials of graphite mentioned above are crystalline flake graphite.

b. Preparation of the first acid system (suspension liquid). Mix the graphite powder obtained from step a. with intercalator and put it through ultrasonic process. The intercalator mentioned above is the first acid composition, and we can obtain graphite—the first acid composition dispersant with the mass concentration of graphite being 0.1-1 g/ml. The first acid composition mentioned above is one of organic strong acid and inorganic strong acid, or a mixture of two or more of them. In order to obtain products with better performances, the optimization for the first acid composition is one of concentrated sulfuric acid, fuming sulfuric acid, concentrated nitric acid, fuming nitric acid, perchloric acid, chlorosulfonic acid, trifluoroacetic acid (TFA), and sulphamic acid, or a mixture of two or more of them.

Then put the graphite—the first acid composition dispersant through ultrasonic stirring process for 0.5-3 hours, and we can obtain the first acid system (suspension liquid). After this step, the first acid composition could intercalate into graphite layers completely c. Preparation of the second acid system. Grind the oxidant and dissolve it into the second acid composition with temperature being 40-60° C., and we obtain oxidant—the second acid composition solution with the mass concentration of oxidant being 0.5-5 g/ml. The oxidant mentioned above includes but not limited to one of nitrate, dichromate, persulfate, permanganate, peroxide, phosphorus oxide, and oxyiodide, or a mixture of two or more of them. The optimization for the oxidant is one of potassium permanganate, ammonium persulfate, potassium persulfate, nitrite of potash, phosphorus pentoxide, and iodine pentoxide, or a mixture of two or more of them. The second acid composition mentioned above is one of organic weak acid and inorganic weak acid, or a mixture of two or more of them. In order to obtain better products, the optimization for the second acid composition is one of strong phosphoric acid, pyrophosphoric acid, metaphosphoric acid, glacial acetic acid, propionic acid, adipic acid, and glutaric acid, or a mixture of two or more of them. A further optimization for the second acid composition is one of phosphorus acid, glacial acetic acid, and adipic acid, or a mixture of two or more of them.

Then add long-chain organic acid into the oxidant—the second acid composition solution. The mass ratio of graphite powder obtained from step a. to long-chain organic acid is 100:0.1.1. The long-chain organic acid mentioned above is saturated organic acid with more carbon atoms than C10. The long-chain organic acid we added serves as passivator for colloid, which could disperse graphene oxide colloid in products uniformly. In order to disperse graphene oxide colloid more uniformly, the long-chain organic acid is one of capric acid, undecylenic acid, lauric acid, tetradecanoic acid, palmitic acid (hexadecylic acid), and octadecanioic acid (stearic acid), or a mixture of two or more of them.

Then put the oxidant—the second acid composition solution with long-chain organic acid through ultrasonic treatment for 0.5 hours. After a process of natural cooling, we can obtain the solution of second acid system.

d. Preparation of graphene oxide. Add the solution of first acid system into the second acid system drop by drop with the rate being 1-2 drops per second at temperature of 40° C. and we obtain mixed liquid. The volume of the first acid system added to the second acid system is calculated according to the following equation (If we add materials according to the proportion described above, we can oxidize the graphite as soon as possible on the premise of saving oxidant, and form graphite oxide effectively).

$$\frac{C_{graphite} \times V_{the\ first\ acid\ system}}{C_{oxidant} \times V_{the\ second\ acid\ system}} = 1: 2\text{-}8$$

Where $C_{graphite}$ is mass concentration of graphite in graphite—the first acid composition dispersant. The first acid system is prepared from ultrasonic process with graphite—the first acid composition dispersant, and there's no wastage of solution and solute. Thus the value of $C_{graphite}$ is equal to the mass concentration of graphite in the first acid system. $V_{the\ first\ acid\ system}$ represents the volume of the first acid system. $C_{oxidant}$ represents the mass concentration of oxidant in oxidant—the second acid composition solution.

We add quite little long-chain organic acid into oxidant—the second acid solution, which nearly has no influence on the mass concentration of oxidant. Thus we can use the mass concentration of graphite in oxidant—the second acid solution as the mass concentration of graphite in the second acid system. $V_{the\ second\ acid\ system}$ represents the volume of the second acid system into which we add the first acid system.

If the mixed liquid is too sticky, we can add a proper amount of the second acid system to dilute it. Then put the mixed liquid into ultrasonic stirring process for 0.5-3 hours, and dissolve it into water drop by drop at environment temperature of 70-100° C. The purpose of adding water is to hydrolyze materials in the mixed liquid. Place the mixture for 3-10 min which is exactly the time for hydrolysis reaction and we obtain combination liquid, namely the graphene oxide suspension liquid. There's heat release during the hydrolysis reaction process, therefore we should control the temperature value between 70° C. and 100° C. The volume of water is calculated according to the following equation (If the amount of water we add exceeds the volume described above, the graphene oxide precipitate cannot be separated out smoothly during the salting out process. If the amount is less than the volume described above, the reaction rate of hydrolysis would be too low to finish the hydrolysis process.).

$$\frac{C_{graphite} \times V_{the\ first\ acid\ system}}{\rho_{water} \times V_{water}} = 1: 20\text{-}50$$

Where $C_{graphene}$ is mass concentration of graphite in graphite—the first acid composition dispersant. $V_{the\ first\ acid\ system}$ represents the volume of the first acid system. $\rho_{water}$ represents the density of water, and $V_{water}$ represents the volume of water.

Treat the combination liquid with ultrasonic stirring process for 0.5-3 hours, then put it into centrifugal process with rotating speed being 4000 r/min for 5 min to remove non-stripped graphite oxide, and take the supernatant as graphene oxide colloid solution.

Then add ammonium sulfate solution with mass concentration of 2-5% into the supernatant and salt it out. Suction filtrate the solution and wash the filter cake with deionized water. After a process of alcohol-washing and drying, we can obtain graphene oxide. The optimization for drying process is vacuum drying with temperature being 45° C. for 3 hours.

The preparation method of graphene using graphene oxide obtained through preparation method above features with the following steps.

e. Put graphene oxide obtained above into dispersant of high boiling point, and put it through ultrasonic distribution treatment to obtain graphene oxide dispersant of 0.1-1 g/ml.

In this step, the optimization for dispersant with high boiling point is one of phosphoric acid with mass concentration being 80%, phosphoric acid with mass concentration being 85%, glycerol, glycol, N-methyl-pyrrolidone, three diethylene, and cyclohexanol, or a mixture of two or more of them. A further optimization is one of phosphoric acid with mass concentration being 80%, glycerol, and N-methyl-pyrrolidone, or a mixture of two or more of them.

f. Put reducing agent into graphene oxide dispersant obtained from step e. The reducing agent mentioned above is one of organic acid and organic acid salt, or a mixture of two or more of them. The mass ratio of graphene oxide in graphene oxide dispersant to reducing agent is 1:2-8.

In this step, the optimization for reducing agent is one of citric acid, gluconic acid, formic acid, ascorbic acid, oxalic acid, sodium citrate, sodium gluconate, sodium formate, sodium ascorbate, and sodium oxalate, or a mixture of two or more of them. A further optimization is one of oxalic acid, sodium citrate, formic acid, and sodium formate, or a mixture of two or more of them.

g. Put the graphene oxide dispersant with reducing agent obtained from step f. into microwave heating process of 400-900W for 5-30 min. Then put it into ultrasonic stripping process of 100-600W for 0.5-3 hours.

h. Add water into the graphene oxide dispersant obtained from step g., of which the volume is the same as the dispersant. After a process of suction filtrate, washing and drying, we can obtain graphene. The optimization for drying process is vacuum drying with temperature being 80° C. for 2 hours.

Compared with traditional preparation methods of graphene oxide and graphene, our invention has several advantages. We adopt a mixture of the first acid system and the second acid system during preparation process, and with the mixed acid system the dosage of strong acid can be reduced significantly, thus reducing the corrosion to equipment. Meanwhile, by adopting this method we can reduce the amount of heat release during the preparation process of graphene, which allows for less deoxy sites in graphene oxide and better dispersity. Besides, in this method the reducing agent is dissolved in the second acid composition, and we disperse graphite in the first acid composition. Because the reducing agent is dissolved into solution in advance, there's liquid-liquid phase reaction occurring in the mixed acid system, which improves the reaction efficiency significantly.

In our invention, we use acid reducing agent to deoxidize graphene oxide for preparation of graphene. The method could make graphene oxide get well-dispersed, avoiding reunion of graphene oxide when adopting alkaline reducing agent in traditional ways as well as the phenomena of nonuniform reducing, which could make the reducing reaction more complete and efficient. Besides, we can obtain graphene of larger slice layers, specific surface areas and better performance through this method, which could be applied to large scale industrial production.

DETAILED DESCRIPTION

Further details of our present invention are described with specific embodiments below.

EXAMPLE 1

Put raw materials of graphite into processes of washing, drying and grinding, and then put them through 200-mesh sieves to obtain graphite powder. 1 g of graphite powder is put through ultrasonic dispersion into 10 ml of concentrated sulfuric acid to form graphite-sulfuric acid dispersant with the mass concentration of graphite being 0.1-1 g/ml. Treat the graphite-sulfuric acid dispersant with ultrasonic agitation with ultrasonic power being 120W for 1.5 hours to make the sulfuric acid intercalating into graphite completely, then the grey black suspension is formed as the first acid system without obvious heat release.

4 g of finely pulverized potassium permanganate is dissolved into 8 ml concentrated phosphoric acid under ultrasonic stirring with solution temperature being controlled at 40-60° C. We can obtain the phosphoric acid solution of potassium permanganate with the mass concentration at 0.5 g/ml. Mildly heat the mixture to dissolve if insoluble products appear. Add 0.01 g octadecanoic acid into the above solution, treat with ultrasonic agitation for 0.5 hour with large amount of heat release, cool down naturally to obtain the brown viscous potassium permanganate—concentrated phosphoric acid solution as the second acid system used in the next step.

With a rate of 1-2 drops per second, add the above potassium permanganate-phosphoric acid viscous solution to the suspension of graphite-sulfuric acid and the reaction temperature is controlled below 40° C., then treat the formed mixture with ultrasonic agitation for 2 hours. Afterwards, add 5 mL concentrated phosphoric acid to dilute the reaction system, and then add the mixture into 50 ml water in a dropwise way. The temperature should be controlled below 70° C., and the hydrolization reaction is completed in 5 min. After hydrolization, treat the mixture with ultrasonic stripping process for 2 hours, and centrifuge it with rotation speed at 4000 r/min for 5 min to remove unshipped graphene oxide. Then take the supernatant as graphene oxide solution. Add ammonium sulfite solution with 4% mass concentration and the same volume as the mixture to salt out and suction filtrate it. Wash the filter cake with water and then alcohol, dry it in a vacuum oven at 45° C. for 3 hours. At last, we obtain the first target products, graphene oxide, with the total mass of 1.3 g. The productive rate is 130% in term of graphite.

Disperse graphene oxide obtained above in 13 ml 80% aqueous glycerol solution, and 3 g oxalic acid is added. The mixture is mildly heated until oxalic acid is dissolved completely. The mixture is heated in a microwave oven with 900W power for 10 min and treated with ultrasonic stripping process with ultrasonic power being 600W for 2 hours. At last the mixture is diluted by water with equal volume, filtrated and washed with water three times. The filter cake is dried under vacuum environment of 80° C. for 2 hours to yield the second target products, graphene, with a total mass of 0.85 g. The productive rate is 85% in term of graphite.

Both graphene oxide and graphene of our products, characterized by Raman spectra, have D-peak, G-peak and 2D-peak, which are unique to graphene. D-peak of graphene oxide is 1357 $cm^{-1}$, and G-peak and 2D-peak are 1602 $cm^{-1}$ and 2843 $cm^{-1}$, respectively D-peak of graphene is 1369 $cm^{-1}$, and G-peak and 2D-peak are 1579 $cm^{-1}$ and 2710 $cm^{-1}$, respectively.

EXAMPLE 2

Put raw materials of graphite into processes of washing, drying and grinding, and then put them through 200-mesh sieves to obtain graphite powder. 1 g of graphite powder is put through ultrasonic dispersion into 10 ml of concentrated sulfuric acid to form graphite-sulfuric acid dispersant with the mass concentration of graphite being 0.1 g/ml. Treat the graphite-sulfuric acid dispersant with ultrasonic agitation with ultrasonic power being 120W for 1.5 hours to make the sulfuric acid intercalating into graphite completely, then the grey black suspension is formed as the first acid system without obvious heat release.

5 g of finely pulverized potassium permanganate is dissolved into 8 ml concentrated phosphoric acid under ultrasonic stirring with solution temperature being controlled at 40-60° C. We can obtain the phosphoric acid solution of potassium permanganate with the mass concentration at 0.5 g/ml. Mildly heat the mixture to dissolve if insoluble products appear. Add 0.01 g octadecanoic acid into the above solution, treat with ultrasonic agitation for 0.5 hour with large amount of heat release, cool down naturally to obtain the brown viscous potassium permanganate-concentrated phosphoric acid solution as the second acid system used in the next step.

With a rate of 2-4 drops per second, add the above potassium permanganate-phosphoric acid viscous solution to the suspension of graphite-sulfuric acid and the reaction temperature is controlled below 50° C., then treat the formed mixture with ultrasonic agitation for 2 hours. Afterwards add 5 mL concentrated phosphoric acid to dilute the reaction system, and then add the mixture into 50 ml water in a dropwise way. The temperature should be controlled below 70° C., and the hydrolization reaction is completed in 5 min. After hydrolization, treat the mixture with ultrasonic stripping process for 2 hours, and centrifuge it with rotation speed at 4000 r/min for 5 min to remove unstripped graphene oxide. Then take the supernatant as graphene oxide solution. Add ammonium sulfate solution with 4% mass concentration and the same volume as the mixture to salt out and suction filtrate it. Wash the filter cake with water and then alcohol, dry it in a vacuum oven at 45° C. for 3 hours. At last, we obtain the first target products, graphene oxide, with the total mass of 1.25 g. The productive rate is 125% in term of graphite, Disperse graphene oxide obtained above in 13 ml 80% aqueous glycerol solution, and 3g oxalic acid is added. The mixture is mildly heated until oxalic acid is dissolved completely. The mixture is heated in a microwave oven with 900W power for 10 min and treated with ultrasonic stripping process with ultrasonic power being 600W for 2 hours. At last the mixture is diluted by water with equal volume, filtrated and washed with water three times. At last the filter cake is dried under vacuum environment of 80° C. for 2 hours to yield the second target products, graphene, with a total mass of 0.8 g. The productive rate is 80% in term of graphite.

Both graphene oxide and graphene of our products, characterized by Raman spectra, have D-peak, G-peak and 2D-peak, which are unique to graphene. D-peak of graphene oxide is 1364 cm$^{-1}$, and G-peak and 2D-peak are 1615 cm$^{-1}$ and 2845 cm$^{-1}$, respectively; D-peak of graphene is 1369 cm$^{-1}$, and G-peak and 2D-peak are 1581 cm$^{-1}$ and 2712 cm$^{-1}$, respectively

EXAMPLE 3

Traditional Hummers Method was used to prepare graphene oxide and graphene as the comparative Example 1. The type and amount of graphite powder and the concentration of concentrated sulfuric acid are identical in example 1 and 2. The amount of strong acid, the reaction efficiency, and the appearance of precipitation in the graphene oxide solution are used as parameters to compare the three examples, which are shown in Table 1.

TABLE 1

Testing results of Example 1-2 and comparative example 1

|  | Example 1 | Example 2 | Comparative Example 1 |
| --- | --- | --- | --- |
| amount of strong acid | 10 ml concentrated sulfuric acid | 10 ml concentrated sulfuric acid | 100 ml concentrated sulfuric acid |
| reaction efficiency | faster | fast | slow |
| appearance of precipitation in the graphene oxide solution | little | no | yes |

As can he seen from the table above, by adopting the technical scheme of the present invention, graphene oxide and graphene can be obtained with lower amount of strong acid and higher reaction efficiency compared with traditional method. And the raw material of graphite powder can react completely without any residue in the solution of graphene oxide. The preparation method of the present invention has obvious improvement.

EXAMPLE 4

Put raw materials of graphite into processes of washing, drying and grinding, and then put them through 200-mesh sieves to obtain graphite powder. 1 g of graphite powder is put through ultrasonic dispersion into 10 ml of fuming nitric acid and treat with ultrasonic agitation with ultrasonic power being 120W for 0.5 hours to make the fuming nitric acid intercalating into graphite completely, then the grey black suspension is formed as the first acid system without obvious heat release.

4 g of finely pulverized ammonium sulfate is dissolved into 0.8 ml pyrophosphatic acid under ultrasonic stirring with solution temperature being controlled at 40° C. Mildly heat the mixture to dissolve if insoluble products appear. Add 2 mg decanoic acid into the above solution, treat with ultrasonic agitation for 0.5 hour, cool down naturally to obtain the colorless viscous ammonium sulfate-pyrophosphatic acid solution as the second acid system used in the next step.

With a rate of 1-2 drops per second, add 0.4 ml the second acid system to the first acid system and the reaction temperature is controlled below 40° C., then treat the formed mixture with ultrasonic agitation for 0.5 hours. Add the mixture into 20 ml water in a dropwise way. The temperature should be controlled below 70° C., and the hydrolization reaction is completed in 3 min. After hydrolization, treat the mixture with ultrasonic stripping process for 0.5 hour, and centrifuge it with rotation speed at 4000 r/min for 5 min to remove unstripped graphene oxide. Then take the supernatant as graphene oxide solution. Add ammonium sulfate solution with 2% mass concentration and the same volume as the mixture to salt out and suction filtrate it. Wash the filter cake with water and then alcohol, dry it in a vacuum oven at 45° C. for 3 hours. At last, we obtain the first target product, graphene oxide, with the total mass of 1.1 g. The productive rate is 110% in term of graphite.

Disperse graphene oxide obtained above in 8 ml 80% phosphoric acid, and 8 g citric acid is added. The mixture is mildly heated until citric acid is dissolved completely. The mixture is heated in a microwave oven with 400W power for 5 min and treated with ultrasonic stripping process with ultrasonic power being 100W for 0.5 hour. The mixture is diluted by water with equal volume, filtrated and washed with water three times. At last the filter cake is dried under vacuum environment of 80° C. for 2 hours to yield the second target product, graphene, with a total mass of 0.78 g. The productive rate is 78% in term of graphite.

Both graphene oxide and graphene of our products, characterized by Raman spectra, have D-peak, G-peak and 2D-peak, which are unique to graphene. D-peak of graphene oxide is 1363 cm$^{-1}$, and G-peak and 2D-peak are 1602 cm$^{-1}$ and 2843 cm$^{-1}$, respectively; D-peak of graphene is 1373 cm$^{-1}$, and G-peak and 2D-peak are 1579 cm$^{-1}$ and 2713 cm$^{-1}$, respectively.

EXAMPLE 5

Put raw materials of graphite into processes of washing, drying and grinding, and then put them through 200-mesh sieves to obtain graphite powder. 1 g of graphite powder is put through ultrasonic dispersion into 5 ml of chlorine sulfonic acid and treat with ultrasonic agitation with ultrasonic power being 120W for 1 hour to make the chlorine sulfonic acid intercalating into graphite completely, then the grey black suspension is formed as the first acid system without obvious heat release.

4 g of finely pulverized potassium sulphate is dissolved into 2 ml metaphosphoric acid under ultrasonic stirring with solution temperature being controlled at 45° C. Mildly heat the mixture to dissolve if insoluble products appear. Add 4 mg undecylenic acid into the above solution, treat with ultrasonic agitation for 0.5 hour, cool down naturally to obtain the brown viscous potassium sulphate-metaphosphoric acid solution as the second acid system used in the next step.

With a rate of 1-2 drops per second, add 1.5 ml the second acid system to the first acid system and the reaction temperature is controlled below 40° C., then treat the formed mixture with ultrasonic agitation for 1 hour. Add the mixture into 25 ml water in a dropwise way. The temperature should be controlled below 75° C., and the hydrolization reaction is completed in 4 min. After hydrolization, treat the mixture with ultrasonic stripping process for 1 hour, and centrifuge it with rotation speed at 4000 r/min for 5 min to remove unstripped graphene oxide. Then take the supernatant as graphene oxide solution. Add ammonium sulfate solution with 3% mass concentration and the same volume as the mixture to salt out and suction filtrate it. Wash the filter cake with water and then alcohol, dry it in a vacuum oven at 45° C. for 3 hours. At last, we obtain the first target product, graphene oxide, with the total mass of 1.3 g. The productive rate is 130% in term of graphite.

Disperse graphene oxide obtained above in 10 ml 85% phosphoric acid, and add 2.6 g gluconic acid. The mixture is mildly heated until gluconic acid is dissolved completely. The mixture is heated in a microwave oven with 500W power for 10 min and treated with ultrasonic stripping process with ultrasonic power being 300W for 1 hour. The mixture is diluted by water with equal volume, filtrated and washed with water three times. At last the filter cake is dried under vacuum environment of 80° C. for 2 hours to yield the second target product, graphene, with a total mass of 0.85 g. The productive rate is 85% in term of graphite.

Both graphene oxide and graphene of our products, characterized by Raman spectra, have D-peak, G-peak and 2D-peak, which are unique to graphene. D-peak of graphene oxide is 1358 cm$^{-1}$, and G-peak and 2D-peak are 1601 cm$^{-1}$ and 2848 cm$^{-1}$, respectively; D-peak of graphene is 1371 cm$^{-1}$, and G-peak and 2D-peak are 1580 cm$^{-1}$ and 2706 cm$^{-1}$, respectively.

EXAMPLE 6

Put raw materials of graphite into processes of washing, drying and grinding, and then put them through 200-mesh sieves to obtain graphite powder. 1 g of graphite powder is put through ultrasonic dispersion into 2 ml of trifluoroacetic acid and treat the graphite-trifluoroacetic acid dispersant with ultrasonic agitation with ultrasonic power being 120W for 1.5 hours to make the trifluoroacetic acid intercalating into graphite completely, then the grey black suspension is formed as the first acid system without obvious heat release.

4 g of finely pulverized potassium nitrate is dissolved into 4 ml glacial acetic acid under ultrasonic stirring with solution temperature being controlled at 50° C. Mildly heat the mixture to dissolve if insoluble products appear. Add 8 mg tetradecanoic acid into the above solution, treat with ultrasonic agitation for 0.5 hour, cool down naturally to obtain the colorless viscous potassium nitrate—glacial acetic acid solution as the second acid system used in the next step.

With a rate of 1-2 drops per second, add 4 ml the second acid system to the first acid system and the reaction temperature is controlled below 40° C., then treat the formed mixture with ultrasonic agitation for 1.5 hours. Add the mixture into 30 ml water in a dropwise way. The temperature should be controlled below 80° C. and the hydrolization reaction is completed in 5 min. After hydrolization, treat the mixture with ultrasonic stripping process for 1.5 hours, and centrifuge it with rotation speed at 4000 r/min for 5 min to remove unshipped graphene oxide. Then take the supernatant as graphene oxide solution. Add ammonium sulfate solution with 4% mass concentration and the same volume as the mixture to salt out and suction filtrate it. Wash the filter cake with water and then alcohol, dry it in a vacuum oven at 45° C. for 3 hours. At last, we obtain the first target product, graphene oxide, with the total mass of 1.25 g. The productive rate is 125% in term of graphite.

Disperse graphene oxide obtained above in 1.25 ml N-methyl pyrrolidone, and 10 g formic acid is added. The mixture is mildly heated until formic acid is dissolved completely. The mixture is heated in a microwave oven with 600W power for 15 min and treated with ultrasonic stripping process with ultrasonic power being 400W for 2 hours. The mixture is diluted by water with equal volume, filtrated and washed with water three times. At last the filter cake is dried under vacuum environment of 80° C. for 2 hours to yield the second target product, graphene, with a total mass of 0.82 g. The productive rate is 82% in term of graphite.

Both graphene oxide and graphene of our products, characterized by Raman spectra, have D-peak, G-peak and 2D-peak, which are unique to graphene. D-peak of graphene oxide is 1357 cm$^{-1}$, and G-peak and 2D-peak are 1601 cm$^{-1}$ and 2839 cm$^{-1}$, respectively D-peak of graphene is 1367 cm$^{-1}$, and G-peak and 2D-peak are 1582 cm$^{-1}$ and 2707 cm$^{-1}$, respectively.

EXAMPLE 7

Put raw materials of graphite into processes of washing, drying and grinding, and then put them through 200-mesh sieves to obtain graphite powder. 1 g of graphite powder is put through ultrasonic dispersion into 3 ml of concentrated sulfuric acid and 7 ml of fuming nitric acid and treat with ultrasonic agitation with ultrasonic power being 120W for 2 hours to make the concentrated sulfuric acid and fuming nitric acid intercalating into graphite completely, then the grey black suspension is formed as the first acid system without obvious heat release.

8 g of finely pulverized phosphoric anhydride is dissolved into 12 ml propionic acid under ultrasonic stirring with solution temperature being controlled at 55° C. Mildly heat the mixture to dissolve if insoluble products appear. Add 10 mg hexadecanoic acid into the above solution, treat with ultrasonic agitation for 0.5 hour, cool down naturally to obtain the colorless viscous a phosphoric anhydride—propionic acid solution as the second acid system used in the next step.

With a rate of 1-2 drops per second, add 12 ml the second acid system to the first acid system and the reaction temperature is controlled below 40° C., then treat the formed mixture with ultrasonic agitation for 2 hours. Add the mixture into 40 ml water in a dropwise way. The temperature should be controlled below 90° C., and the hydrolization reaction is completed in 6 min. After hydrolization, treat the mixture with ultrasonic stripping process for 2 hours, and centrifuge it with rotation speed at 4000 r/min for 5 min to remove unstripped graphene oxide. Then take the supernatant as graphene oxide solution. Add ammonium sulfate solution with 4% mass concentration and the same volume as the mixture to salt out and suction filtrate it. Wash the filter cake with water and then alcohol, dry it in a vacuum oven at 45° C. for 3 hours. At last, we obtain the first target product, graphene oxide, with the total mass of 1.46 g. The productive rate is 146% in term of graphite.

Disperse graphene oxide obtained above in 6 ml glycol, and 5 g ascorbic acid is added. The mixture is mildly heated until ascorbic acid is dissolved completely. The mixture is heated in a microwave oven with 700W power for 20 min and treated with ultrasonic stripping process with ultrasonic power being 300W for 3 hours. The mixture is diluted by water with equal volume, filtrated and washed with water three times. At last the filter cake is dried under vacuum environment of 80° C. for 2 hours to yield the second target products, graphene, with a total mass of 0.93 g. The productive rate is 93% in term of graphite.

Both graphene oxide and graphene of our products, characterized by Raman spectra, have D-peak, G-peak and 2D-peak, which are unique to graphene. D-peak of graphene oxide is 1364 $cm^{-1}$, and G-peak and 2D-peak are 1602 $cm^{-1}$ and 2851 $cm^{-1}$, respectively; D-peak of graphene is 1372 $cm^{-1}$, and G-peak and 2D-peak are 1579 $cm^{-1}$ and 2713 $cm^{-1}$, respectively.

EXAMPLE 8

Put raw materials of graphite into processes of washing, drying and grinding, and then put them through 200-mesh sieves to obtain graphite powder. 1 g of graphite powder is put through ultrasonic dispersion into 4 ml of chlorosulfonic acid and 2 ml of perchloric acid and treat with ultrasonic agitation with ultrasonic power being 120W for 2.5 hours to make the chlorosulfonic acid and perchloric acid intercalating into graphite completely, then the grey black suspension is formed as the first acid system without obvious heat release.

4 g of finely pulverized iodic anhydride is dissolved into 8 ml adipic acid under ultrasonic stirring with solution temperature being controlled at 60° C. Mildly heat the mixture to dissolve if insoluble products appear. Add 2 mg tetradecanoic acid and 3 mg hexadecanoic acid into the above solution, treat with ultrasonic agitation for 0.5 hour, cool down naturally to obtain the colorless viscous iodic anhydride—adipic acid solution as the second acid system used in the next step.

With a rate of 1-2 drops per second, add 5 ml the second acid system to the first acid system and the reaction temperature is controlled below 40° C., then treat the formed mixture with ultrasonic agitation for 2.5 hours. Add the mixture into 45 ml water in a dropwise way. The temperature should be controlled below 95° C., and the hydrolization reaction is completed in 8 min. After hydrolization, treat the mixture with ultrasonic stripping process for 2.5 hours, and centrifuge it with rotation speed at 4000 r/min for 5 min to deposit unstripped graphene oxide. Then take the supernatant as graphene oxide solution. Addammuonium sulfate solution with 5% mass concentration and the same volume as the mixture to salt out and suction filtrate it. Wash the filter cake with water and then alcohol, dry it in a vacuum oven at 45° C. for 3 hours. At last, we obtain the first target product, graphene oxide, with the total mass of 1.18 g. The productive rate is 118% in term of graphite.

Disperse graphene oxide obtained above in 8 ml triethylene glycol, and the mixture of 2g citric, acid and 5 g sodium citrate is added. The mixture is mildly heated until the mixture of citric acid and sodium citrate is dissolved completely. The mixture is heated in a microwave oven with 800W power for 25 min and treated with ultrasonic stripping process with ultrasonic power being 600W for 1.5 hours. The mixture is diluted by water with equal volume, filtrated and washed with water three times. At last the filter cake is dried under vacuum environment of 80° C. for 2 hours to yield the second target product, graphene, with a total mass of 0.81 g. The productive rate is 81% in term of graphite.

Both graphene oxide and graphene of our products, characterized by Raman spectra, have D-peak, G-peak and 2D-peak, which are unique to graphene. D-peak of graphene oxide is 1357 $cm^{-1}$, and G-peak and 2D-peak are 1606 $cm^{-1}$ and 2849 $cm^{-1}$, respectively; D-peak of graphene is 1371 $cm^{-1}$, and G-peak and 2D-peak are 1579 $cm^{-1}$ and 2710 $cm^{-1}$, respectively.

EXAMPLE 9

Put raw materials of graphite into processes of washing, drying and grinding, and then put them through 200-mesh sieves to obtain graphite powder. 1 g of graphite powder is put through ultrasonic dispersion into 1 ml of concentrated nitric acid and treat with ultrasonic agitation with ultrasonic power being 120W for 3 hours to make the concentrated nitric acid intercalating into graphite completely, then the grey black suspension is formed as the first acid system without obvious heat release.

The mixture of finely pulverized 4 g ammonium sulfate, 3 g potassium nitrate and 1 g phosphoric anhydride is dissolved into 10 ml glutaric acid under ultrasonic stirring with solution temperature being controlled at 48° C., Mildly heat the mixture to dissolve if insoluble products appear. Add 2 mg decanoic acid and 6 mg undecylenic acid into the above solution, treat with ultrasonic agitation for 0.5 hour, cool down naturally to obtain the colorless viscous mixed acid solution as the second acid system used in the next step.

With a rate of 1-2 drops per second, add 10 ml the second acid system to the first acid system and the reaction temperature is controlled below 40° C., then treat the formed mixture with ultrasonic agitation for 3 hours. Add the mixture into 35 ml water in a dropwise way. The temperature should be controlled below 100° C., and the hydrolization reaction is completed in 10 min. After hydrolization, treat the mixture with ultrasonic stripping process for 3 hours, and centrifuge it with rotation speed at 4000 r/min for 5 min to remove unstripped graphene oxide. Then take the supernatant as graphene oxide solution. Add ammonium sulfate solution with 5% mass concentration and the same volume as the mixture to salt out and suction filtrate it. Wash the filter cake with water and then alcohol, dry it in a vacuum oven at 45° C. for 3 hours. At last, we obtain the first target product, graphene oxide, with the total mass of 1.4 g. The productive rate is 140% in term of graphite.

Disperse graphene oxide obtained above in 14 ml cyclohexanol, and the mixture of 4 g formic acid and 1 g sodium formate is added. The mixture is mildly heated until the mixture of formic acid and sodium formate is dissolved completely. The mixture is heated in a microwave oven with 900W power for 30 min and treated with ultrasonic stripping process with ultrasonic power being 500W for 2.5 hours The mixture is diluted by water with equal volume, filtrated and washed with water three times. At last the filter cake is dried under vacuum environment of 80° C. for 2 hours to yield the second target product, graphene, with a total mass of 0.89 g. The productive rate is 89% in term of graphite.

Both graphene oxide and graphene of our products, characterized by Raman spectra, have D-peak, G-peak and 2D-peak, which are unique to graphene. D-peak of graphene oxide is 1365 $cm^{-1}$, and G-peak and 2D-peak are 1601 $cm^{-1}$ and 2851 $cm^{-1}$, respectively; D-peak of graphene is 1372 $cm^{-1}$, and G-peak and 2D-peak are 1581 $cm^{-1}$ and 2713 $cm^{-1}$, respectively.

The amount of strong acid (the first acid component) used in examples 4-9 is obviously less than that in comparative example 1. This can avoid corrosion to equipments due to the usage of too much strong acid. We also test the reaction efficiency and appearance of precipitation in the graphene oxide solution in examples 4-9, and the results are listed in table 2:

TABLE 2

Testing results of Example 4-9

| | Example 4 | Example 5 | Example 6 | Example 7 | Example 8 | Example 9 |
|---|---|---|---|---|---|---|
| reaction efficiency | faster | fast | fast | faster | fast | fast |
| appearance of precipitation in the graphene oxide solution | little | no | less | no | no | no |

Compared with Example 1 in table 1, the three parameters of Example 4-9, include the amount of strong acid, reaction efficiency and appearance of precipitation in the graphene oxide solution, are better. The preparation method of the present invention has obvious improvement compared with prior methods.

The examples listed above are just preferred examples of our invention. This cannot be used to limit the protection scope of this invention. Any insubstantial change and replacement based on our present invention by technical staff in this field all belongs to the protection scope required by our invention.

The invention claimed is:
1. A method of preparing graphene oxide based on mixed acid system, comprising:
a. a preparation of graphite powder:
washing, drying, and grinding raw material of graphite;
sieving the ground graphite through a 200-mesh sieve to obtain graphite powder; and
wherein the raw material of graphite is crystalline flake graphite;

b. a preparation of a first acid system:
mixing the graphite powder with an intercalator to obtain a first mixture;
conducting an ultrasonic process on the first mixture;
wherein said intercalator is a first acid composition:
providing a first dispersion including the graphite and a first acid composition, a mass concentration of the graphite being 0.1-1 g/ml;
wherein said first acid composition includes at least one acid selected from the group consisting of organic strong acid and inorganic strong acid; and
conducting an ultrasonic stirring process on the first dispersion for 0.5-3 hours, to obtain the first acid system;
c. a preparation of a second acid system:
grinding an oxidant;
solving the ground oxidant into a second acid composition at a temperature of 40-60° C., to obtain a first solution with a mass concentration of the oxidant of 0.5-5 g/ml:
wherein the second acid composition is an organic weak acid, or an inorganic weak acid, or a mixture thereof;
adding a long-chain organic acid into the first solution to obtain a second solution; wherein a mass ratio of the graphite powder to the long-chain organic acid is 100:0.1-1; wherein the long-chain organic acid is a saturated organic acid with carbon atoms more than C10:
conducting an ultrasonic treatment on the second solution for 0.5 hours; and
naturally cooling the second solution to obtain the second acid system;
d. a preparation of a graphene oxide:
adding the first acid system into the second acid system drop by drop with a rate of 1-2 drops per second to obtain a second mixture; wherein a volume of the first acid system added to the second acid system is calculated according to a first formula:

$$\frac{C_{graphite} \times V_{the\ first\ acid\ system}}{C_{oxidant} \times V_{the\ second\ acid\ system}} = 1:2\text{-}8$$

wherein $C_{graphite}$ is the mass concentration of the graphite in the first dispersion, wherein $V_{the\ first\ acid\ system}$ represents the volume of the first acid system, wherein $C_{oxidant}$ represents the mass concentration of oxidant in the first solution, and wherein $V_{the\ second\ acid\ system}$ represents a volume of the second acid system into which the first acid system is added:
conducting the ultrasonic stirring process on the second mixture for 0.5-3 hours;
dissolving the second mixture into water drop by drop at an environment temperature of 70-100° C.;
keeping the second mixture still for 3-10 min to obtain a combined liquid; wherein a volume of water is calculated according to a second formula:

$$\frac{C_{graphite} \times V_{the\ first\ acid\ system}}{\rho_{water} \times V_{water}} = 1:20\text{-}50$$

wherein $C_{graphite}$ is the mass concentration of the graphite in the first dispersion, wherein $V_{the\ first\ acid\ system}$ represents the volume of the first acid system, wherein $\rho_{water}$ represents a density of water, and wherein $V_{water}$ represents the volume of water;

conducting the ultrasonic stirring process on the combined liquid for 0.5-3 hours;
conducting a centrifuging process on the combined liquid at a rate of 4000 r/min for 5 min to obtain a supernatant;
adding an ammonium sulfate solution with a mass concentration of 2-5% into the supernatant to obtain a third solution;
salting out the third solution to obtain a fourth solution;
suction filtrating the fourth solution to obtain a filter cake;
washing the filter cake with deionized water;
alcohol washing the filter cake: and
drying the filter cake to obtain the graphene oxide.

2. The method of claim 1, wherein said first acid composition includes at least one acid selected from the group consisting of concentrated sulfuric acid, fuming sulfuric acid, concentrated nitric acid, fuming nitric acid, perchloric acid, chlorosulfonic acid, trifluoroacetic acid (TFA), and sulphamic acid; and
wherein said oxidant includes at least one oxidant selected from the group consisting of nitrate, dichromate, persulphate, permanganate, peroxide, phosphorus oxide, and oxyiodide.

3. The method of claim 2, wherein said first acid composition includes at least one agent selected from the group consisting of concentrated sulfuric acid, fuming nitric acid, perchloric acid, and chlorosulfonic acid; and
wherein said oxidant includes at least one agent selected from the group consisting of nitrate, potassium permanganate, ammonium persulfate, potassium persulfate, nitrite of potash, phosphorus pentoxide, and iodine pentoxide.

4. The method of claim 1, wherein said second acid composition includes at least one agent selected from the group consisting of strong phosphoric acid, pyrophosphoric acid, metaphosphoric acid, glacial acetic acid, propionic acid, adipic acid, and glutaric acid; and
wherein said long-chain organic acid and at least one agent selected from the group consisting of capric acid, undecylenic acid, lauric acid, tetradecanoic acid, palmitic acid, and octadecanioic acid.

5. The method of claim 4, wherein said second acid composition includes at least one agent selected from the group consisting of phosphoric acid, glacial acetic acid, and adipic acid; and
wherein said long-chain organic acid includes at least one agent selected from the group consisting of capric acid, palmitic acid, and octadecanioic acid.

6. The method of claim 1, further comprising:
e. adding the graphene oxide into a dispersant with a high boiling point, conducing an ultrasonic distribution treatment to obtain a second dispersion with a concentration of 0.1-1 g/ml;
f. adding a reducing agent into the second dispersion wherein the reducing agent is one of organic acid and organic acid salt, or a mixture of two or more organic acids and organic acid salts; wherein a mass ratio of the graphene oxide to the reducing agent is 1:2-8;
g. conducting a microwave heating process on the second dispersion at 400-900W for 5-30 min; conducting the ultrasonic stripping process on the second dispersion at 100-600W for 0.5-3 hours; and
h. adding water into the second dispersion fifth solution, wherein a volume of the water is the same as that of the second dispersion; suction filtrating, washing, and drying the fifth solution to obtain the graphene.

7. The method of claim 6, wherein said dispersant includes at least one agent selected from the group consisting of phosphoric acid with mass concentration being 80%, phosphoric acid with a mass concentration of 85%, glycerol, glycol, N-methyl-pyrrolidone, three diethylene, and cyclohexanol.

8. The method of claim 7, wherein said dispersant includes at least one agent selected from the group consisting of phosphoric acid with a mass concentration of 80%, glycerol, and N-methyl-pyrrolidone.

9. The method of claim 6, wherein said reducing agent includes at least one agent selected from the group consisting of citric acid, gluconic acid, formic acid, ascorbic acid, oxalic acid, sodium citrate, sodium gluconate, sodium formate, sodium ascorbate, and sodium oxalate.

10. The method of claim 9, wherein said reducing agent includes at least one agent selected from the group consisting of oxalic acid, sodium citrate, formic acid, and sodium formate, or a mixture of two or more of them.

* * * * *